Oct. 25, 1966  R. BACHOWSKI ET AL  3,281,238
TREATMENT OF MOLTEN ALUMINOUS METAL
Filed Nov. 13, 1963
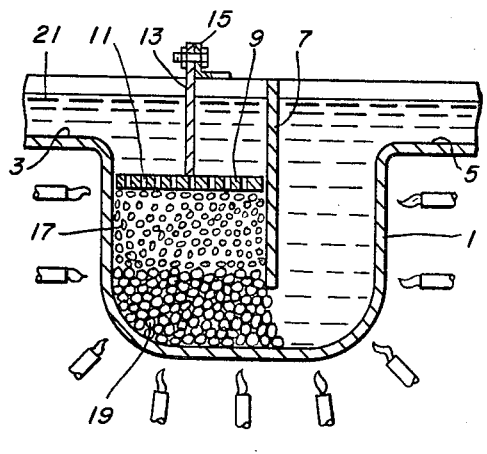
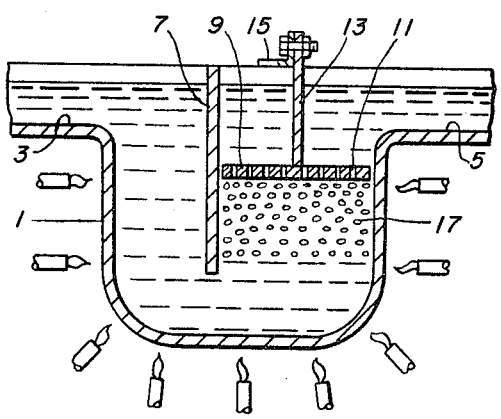
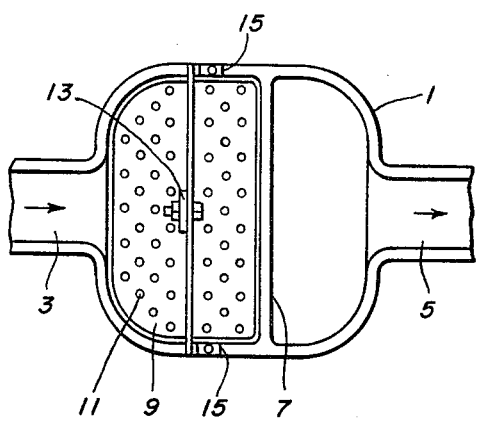
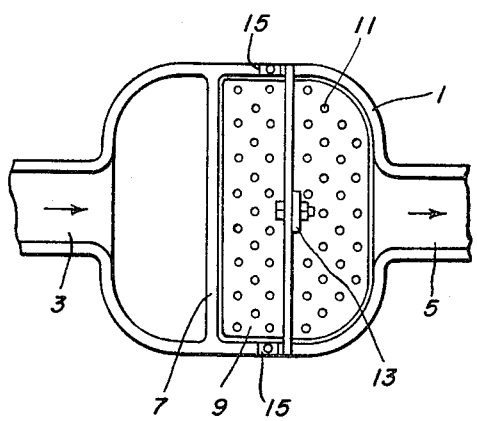
INVENTORS.
RONALD BACHOWSKI,
PAUL D. HESS and
KENNETH J. BRONDYKE
By Frederick P. Weidner Jr.
Attorney United States Patent Office 3,281,238
Patented Oct. 25, 1966

3,281,238
TREATMENT OF MOLTEN ALUMINOUS METAL
Ronald Bachowski, New Kensington, Paul D. Hess, Arnold, and Kenneth J. Brondyke, Oakmont, Pa., assignors to Aluminum Company of America, Pittsburgh, Pa., a corporation of Pennsylvania
Filed Nov. 13, 1963, Ser. No. 323,427
11 Claims. (Cl. 75—93)

This invention relates to the separation of impurities from molten aluminous metal and it is especially concerned with the removal of non-metallic impurities such as gas and suspended particles of oxide. The term "aluminous metal" as used herein refers to both aluminum and alloys wherein this metal is the predominant component.

It is well known that impurities in aluminous metal products affect their properties and that a maximum amount is often specified in order to insure attainment of the desired properties. Demands for improved properties in these products has further emphasized the need for control of impurities, particularly those that cause a discontinuity in the internal structure of the cast or wrought article. Voids in the metal product and imbedded non-metallic particles are examples of such discontinuities. To reduce or eliminate such defects in the final products requires a treatment of the molten metal from which the products are made. Various means of removing gas and non-metallic impurities have been employed such as fluxing with chlorine gas or an inert gas, or by introducing decomposable substances into the molten charge, or by stirring certain relatively stable fused salts into the molten metal and allowing the charge to stand and obtain separation of the two liquids. While these have been partially effective under particular conditions they have been time-consuming and costly with the result that investigations have been made in reducing the cost and improving the general effectiveness of the treatment.

Another method that has been more effective in removing gas from molten aluminous metal involves introducing a fluxing gas in a bed of granules of a refractory material while the metal is passed through the bed. Neither the gas or the refractory material alone has the capacity for reducing the non-metallic impurity content to a low level. A search has been made to find a material which would perform the functions of both the fluxing gas and the refractory filter bed for removing non-metallic impurities from the molten metal.

With respect to gas held by molten aluminous metal it is well known that the molten metal can absorb gas from the atmosphere, the furnace, holding pot or metal transfer equipment as well as from the metal charged to the melting furnace. The solubility of gas generally increases with the temperature of the metal but when the metal solidifies the solubility is sharply reduced and appears in the form of bubbles in the solid metal. All of the gas in a melt may not be dissolved, some may be associated with the suspended non-metallic particles. The gas found in molten aluminous metal is largely hydrogen and hence measurements of the quantity of that gas in a melt or the solidified metal are accepted as a reliable indication of the gas content of the metal. Furthermore, it has been found that when the hydrogen content is very low, the problems of gas content are greatly diminished or disappear. The determinations of gas content in our investigation have been based upon the measurement of the hydrogen content of the metal.

It is an object of our invention to provide a method for removing both gas and non-metallic impurities from molten aluminous metal which is adapted to either continuous or batch operation.

A particular object is to provide a method for removing non-metallic impurities from molten aluminous metal by passing the metal through a bed of specially prepared material.

Another object is to provide a method of reducing the gas and non-metallic impurity content of molten aluminous metal which does not involve injecting a fluxing gas into the molten metal during the treatment thereof.

Still another object is to provide a method of simultaneously degassing molten aluminous metal and removing suspended non-metallic particles from melt which is easily adapted to conventional methods of transferring molten metal from a furnace or holding pot to a mold or to another holding container.

These and other objects and advantages are achieved, we have found, by passing the molten metal through a submerged bed of specially prepared particles of carbonaceous material. It has been discovered that the carbonaceous material not only absorbs gas from the molten metal, irrespective of the manner in which the gas may be held, but it removes non-metallic particles suspended in the melt without becoming quickly clogged with such particles. The density of the solid metal is increased and the defects associated with gas are decreased as a result of removing at least a portion of the aforementioned impurities. The carbonaceous material is cheap enough to permit discard upon reaching the end of its useful life and thus avoid the expense of rejuvenation such as is needed where expensive materials are used. The apparatus needed to carry out the process is simple and can be easily and conveniently added to existing metal holding and transfer equipment.

The carbonaceous material which is required for carrying out the process is prepared by mixing calcined, crushed petroleum coke and a pitch binder, molding the mixture and baking the molded product within the temperature range of 900 to 1200° C. under non-oxidizing conditions whereby substantially all of the volatile substances in the binder are driven off. The baked product is cooled, preferably to room temperature, and then crushed and screened to provide particles of the desired size, namely, ½ inch to 8 mesh. This material is placed in a suitable container through which the molten metal can be passed and which will hold a submerged bed of the carbonaceous material. To insure effective action of the carbonaceous bed and to prevent clogging of it with frozen metal the bed material should be preheated close to or above the melting point of the metal, preferably at 675° to 800° C., before being brought into contact with the molten metal. It is important that the carbonaceous material be fresh, that is, it should not be used for other purposes before exposure to the molten metal since its gas aborptive ability can be adversely affected by such other use. The carbonaceous material which has been so prepared is referred to here as being activated for without the baked binder the coke has little, if any, capacity to remove gas from the molten metal. The combination of calcined petroleum coke and baked binder yields a material which has a gas absorptive capacity which neither one alone provides.

The coke used in the production of the bed material should be the residue of petroleum distillation and is a well-known commercial product. Coke derived from coal, it has been found, does not possess the ability to degas the molten metal when mixed with binder and baked as described above. The composition and texture of the petroleum coke appear to have a significant effect upon the performance of the material used to degas the molten metal. Petroleum coke also has good resistance to attrition thereby minimizing contamination of the molten metal with carbonaceous particles.

Before the petroleum coke is used, it must be calcined, that is, it is heated to about 900 to 1200° C. under non-oxidizing conditions for a sufficient time to drive off substantially all of the volatile substances remaining in the coke. Coke which has been calcined in this manner usually has a density of between 2 and 2.1 grams per cubic centimeter.

The binder employed to form an aggregate of the crushed coke particles is of the pitch or tar types, such as coke oven pitch, and are well-known commercial products. For example, a pitch having a softening point of about 110° C. has been found suitable. The binder should be carbonized in the subsequent baking operation and thus form a solid bond between the coke particles. Generally from 15 to 25%, by weight, of the initial mixture of coke and binder should consist of the binder, the precise amount used depending upon the size of the coke particles and method of consolidating the mixture.

In addition to the binder the initial mixture may contain scrap from previously consolidated and baked material or material that has been used as an electrode, for example. In any case the fresh calcined coke should constitute the major portion of the composition which is to be consolidated.

After the coke and binder have been thoroughly mixed in a chamber heated to a high enough temperature to permit flow of the binder, the mixture is pressed or extruded into a molded form whereupon is baked as mentioned above. It is necessary to mold the aggregate in order to place it in convenient form for baking. The baker product has an apparent density of 1.50 to 1.70 grams per cubic centimeter and has a foam-like texture, there being multitudes of bubbles or voids which are relatively small and uniform in size and are separated from each other. By reason of this condition the material is considered to have a porous structure to therefore present an increased surface area of the particles for exposure to the molten metal as compared to the area presented by a non-porous material. The crushed carbonaceous material will have the same structure, of course, as that of the baked product. By reason of the relatively low density of the material it is necessary to hold it under the surface of the molten metal by some suitable means such as a perforated plate or screen.

To effect the removal of gas and suspended non-metallic particles, the molten aluminous metal is passed through a submerged bed of the activated carbonaceous particles which is at least 4 inches in depth at a rate of not more than 150 pounds per hour per square inch of cross sectional area of the bed taken in a direction normal to the depth of the bed and preferably not less than a rate of 40 pounds per hour per square inch. Although the bed may be disposed in any direction with respect to the flow of metal, the preferred arrangement is that of passing the metal in a vertical direction through a horizontally disposed bed. It is to be understood that the carbonaceous material of the bed is substantially uniform in depth. The molten metal should normally be within the temperature range of 675 to 800° C. Although a bed may have a depth of only 4 inches, better results are obtained if it is at lesat 5 inches in depth. The maximum depth of bed material will depend on the capacity of the equipment used. Beds having a depth of 14 inches have been successfully used.

The size of the carbonaceous particles in the bed is important in order to achieve effective removal of the impurities in the molten metal without impeding the flow of metal to an uneconomical extent. Generally the bed will consist of a mixture of particles varying in size and should be within the range of 0.5 to 0.09 inch, which will permit the particles to pass through a ½ inch opening but be retained on an 8 mesh sieve. For best results the particle size should be between 0.265 and 0.132 inch which is equivalent to passing through a 3 mesh sieve but being retained on a 6 mesh screen. The mesh sizes as used herein are based on Standard U.S. Sieve Series. In cases where the metal flows downwardly through the bed and the outlet for the metal is adjacent the base of the bed it is advisable to use larger pieces of carbonaceous material or even balls or pebbles of a refractory material such as corundum. This arrangement minimizes the escape of any fine material from the bed. In determining the proper depth of the bed, only the finer material is taken into account, the coarser material only serving as a base or support for the bed.

The material can be passed upwardly or downwardly through the bed depending upon the apparatus used. For continuous operation we have found that an upward flow arrangement is better than a downward flow.

Aluminum and all aluminum base alloys which contain gas and suspended non-metallic particles are benefitted by passing through the bed of carbonaceous material described above. It will be appreciated that different melts will contain different amounts of impurities and that the composition of the alloys can affect the tendency of a melt to react with the moisture or other sources of gas. Alloys containing magnesium are more susceptible to oxidation and absorption of gas than alloys which do not contain that element under the same melting conditions.

The method described above can be carried out in various designs of apparatus, depending upon the nature of the metal transfer operation, as illustrated in the accompanying drawings wherein:

FIG. 1 is a sectional elevation of a transfer trough wherein the metal flows downwardly through the bed;

FIG. 2 is a plan view of the apparatus shown in FIG. 1;

FIG. 3 is a sectional view of a transfer trough arrangement wherein the metal flows upwardly through the bed; and FIG. 4 is a plan view of the apparatus shown in FIG. 3.

Referring to FIGS. 1 and 2, a circular basin 1 of suitable material, such as cast iron, is attached, or may form an integral part of a metal transfer trough 3 for delivering molten metal to the basin 1 and transfer trough 5 for receiving the metal treated in the basin. The basin is divided into two portions by partition 7 which extends downwardly and terminates above the basin so that metal can flow under it. The carbonaceous material will float in molten aluminous metal, therefore, a retainer plate 9 having holes 11 therein for keeping the bed material submerged is utilized and is suspended by arm 13 from bracket 15 which rests upon or is attached to the upper edge of the basin 1. Large pieces of carbonaceous material 19 on the bottom of the basin support finer carbonaceous material 17 in the form of a bed at least 4 inches in depth. Molten metal 21 enters the basin, passes through the perforated plate and moves downwardly through the carbonaceous bed and supporting material. It passes under the partition 7 and moves upwardly to the discharge trough 5. The basin should be heated by any suitable means such as by jets of gas flames.

Operation of the unit may begin with placing the carbonaceous material in the basin, preheating it and then adding the molten metal. The retainer plate must be positioned and preheated also, in order to prevent freezing of the metal on the plate. Alternatively, the basin and plate can be preheated and the carbonaceous material heated in a separate container and then be placed in the basin before molten metal is introduced.

Apparatus for treating metal flowing upwardly is illustrated in FIGS. 3 and 4 wherein the parts of the apparatus appearing in FIGS. 1 and 2 are re-arranged. A basin 1 is connected to a supply trough 3 and discharge trough 5. A partition 7 divides the basin into two compartments with a passageway at the base of the partition. The carbonaceous material 17 is held below the surface of the molten metal by a retainer plate 9 having perforations 11 therein, the plate being suspended by arm 13 from bracket 15.

In operation the basin 1 is appropriately heated and molten metal added to partially fill the basin. The carbonaceous material, preheated in a separate container is poured on top of the metal to form a bed at least 4 inches in depth and the retainer plate, also preheated, is positioned so as to submerge a portion of the bed. More molten metal is added to completely submerge the bed and the flow of metal can then be started. To prevent escape of any powdered carbonaceous material it may be helpful to place a screen under the retainer plate.

The following examples will serve to illustrate the filtering and degassing process of our invention and the results obtained thereby.

In one case, apparatus of the kind shown in FIGS. 3 and 4 was used. In this instance a molten aluminum base alloy having a nominal composition of aluminum, 7.0% silicon and 0.3% magnesium was passed through a 5 inch deep carbonaceous material bed. The hydrogen content of the molten metal prior to filtering was 0.36 ml./100 gm. The initial density measurements made on metal frozen under a reduced pressure of 5 mm. indicated that the unfiltered metal had a density of 2.14 grams per cubic centimeter. The carbonaceous material was prepared by mixing calcined petroleum coke and from 18 to 20% pitch, molding the mixture and heating the molded product in a heating chamber to between 1000 to 1100° C. to activate it for subsequent use and thereafter the molded material was crushed and screened to obtain particles of a mesh size of −3 to +6, Standard U.S. Sieve Series. The crushed carbonaceous material was heated to 760° C. and immediately transferred to the apparatus to form the desired bed. The bed was held in position by a retainer plate as molten metal was introduced to cover the bed. The molten metal was passed through the filter bed at the rate of 75 pounds per hour per square inch of horizontal cross sectional area of the bed. The hydrogen content after filtration was 0.17 ml./100 gm. or a reduction of 47% and the density rose to 2.64 grams per cubic centimeter.

In another instance a molten aluminum base alloy having a nominal composition of aluminum, 1.6% copper, 2.5% magnesium, 0.30% chromium, and 5.6% zinc was filtered in apparatus of the type shown in FIGS. 1 and 2. The downspout was filled with a 9 inch bed of ¼ to ½ inch size carbonaceous material particles and held in position by a retainer plate. The bed material had been heated to 700° C. immediately before being transferred to the apparatus to form the bed. The carbonaceous material was prepared by mixing calcined petroleum coke, a small amount of previously baked scrap material, and from 18 to 20% pitch, molding the mixture and heating the molded mixture to 1000 to 1100° C. The baked material was thereafter crushed and screened to obtain the aforementioned particle size. The molten metal was passed through the filter bed at the rate of 40 pounds per hour per square inch of horizontal cross sectional area of the bed. The hydrogen content before filtration was 0.32 ml./100 gm. and after filtration it was 0.15 or a 53% reduction. The density as measured by metal frozen under a reduced pressure of 5 mm. indicated that the density prior to filtration was 2.1 grams per cubic centimeter and after filtration the density rose to 2.75 grams per cubic centimeter.

In another test using apparatus of the kind shown in FIGS. 3 and 4 molten aluminum base alloy having a nominal composition of aluminum, 0.45% manganese, 4.0% magnesium, and 0.10% chromium was filtered through two different types of bed material in two separate tests. The bed material in the first test was calcined petroleum coke alone and in the second test the bed material was calcined petroleum coke plus pitch, which mixture was prepared by mixing calcined petroleum coke and 18 to 20% pitch, molding the mixture, and heating the molded product in a chamber to a temperature of 1000 to 1100° C. In both tests the bed material was crushed and screened to obtain particles of a −3 +6 mesh size, and was heated to 760° C. immediately prior to introduction into the apparatus to form the bed. In both tests the beds had a depth of eight inches and they were held in position by a retainer plate. The flow rate of the molten metal through the bed was 40–49 pounds per hour per square inch of horizontal cross sectional area of the bed in both tests. In the test using a bed of calcined petroleum coke, the metal prior to filtering showed a density of 2.21 grams per cubic centimeter, as measured by metal frozen under a reduced pressure of 5 mm., and a hydrogen content of 0.39 ml./100 gm. After filtration through the said petroleum coke bed the density rose to 2.56 grams per cubic centimeter but there was zero reduction in hydrogen removal. The metal prior to filtering through the bed of baked petroleum coke and pitch showed a density of 2.1 grams per cubic centimeter and a hydrogen content of 0.42 ml./100 gm. After filtration through said bed the density rose to 2.51 grams per cubic centimeter and the hydrogen content was 0.30 ml./100 gm. or a 33% reduction in hydrogen.

We claim:

1. The method of simultaneously degassing and filtering molten aluminous metal comprising passing the metal containing hydrogen gas and impurities through a submerged bed of particles of fresh porous carbonaceous material composed principally of calcined petroleum coke and a carbonized tar or pitch binder, said particles having a size of between 0.5 and 0.09 inch, said bed having a depth of not less than 4 inches, said metal being passed through said bed at a rate of not more than 150 pounds per hour per square inch of cross section taken in a direction normal to the depth of the bed, and recovering the purified metal, whereby the hydrogen content of the metal is substantially reduced and the density of the solid metal is increased.

2. The method of degassing and filtering molten aluminous metal according to claim 1 wherein the particle size is between −3 and +6 mesh.

3. The method of simultaneously degassing and filtering molten aluminous metal according to claim 1 wherein the metal is passed through the bed at a rate of not more than 150 pounds per hour per square inch of horizontal cross sectional area of the bed.

4. The method of degassing and filtering molten aluminous metal comprising passing the metal containing hydrogen gas and impurities through a submerged bed of particles of fresh porous carbonaceous material produced by heating a molded mixture composed principally of calcined petroleum coke and a tar or pitch binder to a temperature within the range of 900 to 1200° C. and crushing said molded product, said particles having a size of between 0.5 and 0.09 inch, said bed having a depth of not less than 4 inches, said metal being passed through said bed at a rate of not more than 150 pounds per hour per square inch of horizontal cross sectional area of the bed, and recovering the purified metal, whereby the hydrogen content of the metal is substantially reduced and the density of the solid metal is increased.

5. The method of degassing and filtering molten aluminous metal comprising passing the metal containing hydrogen gas and impurities through a submerged bed of particles of fresh porous carbonaceous material produced by heating a molded mixture composed principally of calcined petroleum coke and 15 to 25%, by weight, of a tar or pitch binder to a temperature within the range of 900 to 1200° C. and crushing said molded product, said particles having a size of between 0.5 and 0.09 inch, said bed having a depth of not less than 4 inches, said metal being passed through said bed at a rate of not more than 150 pounds per hour per square inch of horizontal cross sectional area of the bed, and recovering the purified metal, whereby the hydrogen content of the metal is substantially reduced and the density of the solid metal is increased.

6. The method of degassing and filtering molten aluminous metal comprising passing the metal containing hydrogen gas and impurities through a submerged bed of particles of fresh porous carbonaceous material composed principally of calcined petroleum coke and a carbonized tar or pitch binder, said particles having a size of between −3 and +6 mesh, said bed having a depth of not less than 4 inches, said metal being passed through said bed at a rate of between 40 and 150 pounds per hour per square inch of horizontal cross sectional area of the bed, and recovering the purified metal, whereby the hydrogen content of the metal is substantially reduced and the density of the solid metal is increased.

7. The method of simultaneously degassing and filtering molten aluminous metal comprising providing carbonaceous particles 0.5 to 0.09 inch in size resulting from heating a molded mixture of petroleum coke and pitch or tar binder to a temperature within the range of 900 to 1200° C. and crushing the bonded product, heating said particles to between 675 and 800° C., forming a bed of said hot particles at least 4 inches in depth, submerging said bed in the molten metal and passing the molten metal containing hydrogen gas and impurities through the said bed at a rate of not more than 150 pounds per hour per square inch of cross section taken in a direction normal to the depth of the bed, and recovering the purified metal, whereby the hydrogen content of the metal is substantially reduced and the density of the solid metal is increased.

8. The method of simultaneously degassing and filtering molten aluminous metal according to claim 7 wherein the metal is passed through the bed at a rate of not more than 150 pounds per hour per square inch of horizontal cross sectional area of the bed.

9. The method of simultaneously degassing and filtering molten aluminous metal comprising providing carbonaceous particles 0.5 to 0.09 inch in size resulting from heating a molded mixture of petroleum coke and 15 to 25%, by weight, of a tar or pitch binder to a temperature within the range of 900 to 1200° C. and crushing the bonded product, heating said particles to between 675 and 800° C., forming a bed of said hot particles at least 4 inches in depth, submerging said bed in the molten metal and passing the molten metal containing hydrogen gas and impurities through the said bed at a rate of not more than 150 pounds per hour per square inch of horizontal cross sectional area of the bed, and recovering the purified metal, whereby the hydrogen content of the metal is substantially reduced and the density of the solid metal is increased.

10. The method of simultaneously degassing and filtering molten aluminous metal comprising providing carbonaceous particles of between −3 and +6 mesh resulting from heating a molded mixture of petroleum coke and 15 to 25%, by weight, of a tar or pitch binder to a temperature within the range of 900 to 1200° C. and crushing the bonded product, heating said particles to between 675 and 800° C., forming a bed of said hot particles at least 4 inches in depth, submerging said bed in the molten metal and passing the molten metal containing hydrogen gas and impurities through the said bed at a rate of between 40 to 150 pounds per hour per square inch of horizontal cross sectional area of the bed, and recovering the purified metal, whereby the hydrogen content of the metal is substantially reduced and the density of the solid metal is increased.

11. The method of simultaneously degassing and filtering molten aluminous metal comprising providing carbonaceous particles of between −3 and +6 mesh resulting from heating a molded mixture of petroleum coke and 15 to 25%, by weight, of coke oven pitch to a temperature within the range of 900 to 1200° C. and crushing the bonded product, heating said particles to between 675 and 800° C., forming a bed of said hot particles at least 4 inches in depth, submerging said bed in the molten metal and passing the molten metal containing hydrogen gas and impurities through the said bed at a rate of not more than 150 pounds per hour per square inch of horizontal cross sectional area of the bed, and recovering the purified metal, whereby the hydrogen content of the metal is substantially reduced and the density of the solid metal is increased.

References Cited by the Examiner
UNITED STATES PATENTS

| | | | |
|---|---|---|---|
| 2,683,107 | 7/1954 | Juel | 210—69 |
| 2,721,184 | 10/1955 | Voorhies | 55—74 |
| 2,863,558 | 12/1958 | Brondyke et al. | 210—69 |
| 3,006,473 | 10/1961 | Gamber | 210—69 |
| 3,122,594 | 2/1964 | Kielback | 55—90 |

REUBEN FRIEDMAN, *Primary Examiner.*

C. N. HART, *Assistant Examiner.*